(12) United States Patent
Yokota

(10) Patent No.: US 9,441,101 B2
(45) Date of Patent: Sep. 13, 2016

(54) FLUORORUBBER COMPOSITION

(71) Applicant: NOK Corporation, Tokyo (JP)

(72) Inventor: Atsushi Yokota, Kanagawa (JP)

(73) Assignee: NOK Corporation, Tokyo (JP)

( * ) Notice: Subject to any disclaimer, the term of this patent is extended or adjusted under 35 U.S.C. 154(b) by 172 days.

(21) Appl. No.: 14/097,701

(22) Filed: Dec. 5, 2013

(65) Prior Publication Data

US 2014/0163153 A1  Jun. 12, 2014

(30) Foreign Application Priority Data

Dec. 7, 2012  (JP) ................................. 2012-268283

(51) Int. Cl.
| | |
|---|---|
| C08L 27/14 | (2006.01) |
| C08L 27/18 | (2006.01) |
| C08L 27/20 | (2006.01) |
| C08L 27/16 | (2006.01) |
| G11B 25/04 | (2006.01) |
| C08K 3/22 | (2006.01) |

(52) U.S. Cl.
CPC ................ C08L 27/20 (2013.01); C08L 27/16 (2013.01); G11B 25/043 (2013.01); C08K 2003/222 (2013.01)

(58) Field of Classification Search
USPC ........................................ 524/433, 544, 545
See application file for complete search history.

(56) References Cited

U.S. PATENT DOCUMENTS

2006/0217491 A1\* 9/2006 Higashira ............... C08F 14/18
525/326.3
2011/0274861 A1\* 11/2011 Stevens .................. C08L 27/16
428/36.91

FOREIGN PATENT DOCUMENTS

| EP | 1764391 A1 \* | 3/2007 |
|---|---|---|
| EP | 1 953 190 A1 | 8/2008 |
| EP | 1953190 A1 \* | 8/2008 |
| JP | 2007-137977 A | 6/2007 |
| JP | 2011-042714 | 3/2011 |
| WO | WO 2004/094479 A1 | 11/2004 |
| WO | WO-2010/026912 A1 \* | 3/2010 |
| WO | WO 2010/026912 A1 | 3/2010 |

OTHER PUBLICATIONS

European extended Search Report from corresponding European application No. 13194404.3 dated Apr. 22, 2014 (8 pgs).

\* cited by examiner

*Primary Examiner* — Peter D Mulcahy
*Assistant Examiner* — Henry Hu
(74) *Attorney, Agent, or Firm* — Brinks Gilson & Lione

(57) ABSTRACT

Provided is a fluororubber composition which does not deteriorate workability during roll kneading, does not cause foaming during crosslinking and molding, and is capable of giving a crosslinked molded article which exhibits desired hardness and sealing property without using a reinforcing inorganic filler such as carbon black and silica. The fluororubber composition includes, relative to 100 parts by weight of a vinylidene fluoride-copolymerized, fluorine-containing elastomer copolymer having a glass transition temperature and a melting point, no reinforcing inorganic filler, 5 to 100 parts by weight of a PTFE filler, 0.5 to 10 parts by weight of a polyol crosslinking agent, 1 to 15 parts by weight of magnesium oxide, and 0.1 to 2 parts by weight of hydrotalcite. Preferably, 0.1 to 10 parts by weight of a quaternary onium salt crosslinking accelerator is further included.

18 Claims, No Drawings

FLUORORUBBER COMPOSITION

RELATED APPLICATION

This application claims priority under 35 U.S.C. §119 to Japanese Patent Application No. 2012-268283, filed Dec. 7, 2012, the entire specification of which is hereby expressly incorporated by reference.

TECHNICAL FIELD

The present invention relates to a fluororubber composition. More particularly, the present invention relates to a fluororubber composition to be used as a material for molding a stopper which is built into a hard disc drive.

BACKGROUND ART

In general, a fluororubber is obtained by blending a crosslinking agent or a crosslinking accelerator with a reinforcing inorganic filler such as carbon black and silica, and it is crosslinked and molded to be used as a sealing material. Also, a molding material for a stopper which is built into a hard disc drive is obtainable by blending carbon black as the reinforcing inorganic filler as disclosed in Patent Documents 1 and 2, for example. However, due to a reduction (narrowing) of a gap (clearance) between a disc and a head involved in a recent increase in hard disc drive capacity, there has been a problem that a failure in writing or reading occurs when the filler contained in the rubber composition is separated from the rubber composition.

As a countermeasure for the problem, use of a rubber composition which can be crosslinked without using the reinforcing inorganic filler is contemplated, but such a countermeasure entails problems such as deterioration in workability of the rubber composition free from the reinforcing inorganic filler during roll mixing and a failure in attaining desired hardness of a crosslinked and molded product.

Meanwhile, use of PTFE as a filler which enables to finely adjust hardness and to ensure strength is contemplated. Patent Document 3 describes that a crosslinked and molded article of a fluororubber composition containing 1 to 100 parts by weight of PTFE, preferably PTFE in the form of a fine powder, relative to 100 parts by weight of a fluororubber has excellent compression set and chemical resistance and is capable of attaining shore A hardness of about 55 to 90.

In the case where the PTFE content is increased for the purpose of attaining shore A hardness of 70 or more, the polymer becomes excessively hard to deteriorate kneading workability, resulting in addition of a step of preliminarily heating the polymer or the like and in a cost increase for kneading using a high-power kneader or the like. Therefore, it can be said that the upper limit of shore A hardness is about 70 in the case of improving hardness only by the blending of PTFE.

PRIOR ART DOCUMENT

Patent Document

Patent Document 1: WO2004/094479
Patent Document 2: WO2010/026912
Patent Document 3: JP-A-2011-42714

OUTLINE OF THE INVENTION

Problem to be Solved by the Invention

An object of the present invention is to provide a fluororubber composition which does not deteriorate workability during roll kneading, does not cause foaming during crosslinking and molding, and is capable of giving a crosslinked molded article which exhibits desired hardness and sealing property without using a reinforcing inorganic filler such as carbon black and silica.

Means for Solving the Problem

The object of the present invention is attained by a fluororubber composition comprising, relative to 100 parts by weight of a vinylidene fluoride-copolymerized fluorine-containing elastomer copolymer having a glass transition temperature and a melting point, no reinforcing inorganic filler, 5 to 100 parts by weight of a PTFE filler, 0.5 to 10 parts by weight of a polyol crosslinking agent, 1 to 15 parts by weight of magnesium oxide, and 0.1 to 2 parts by weight of hydrotalcite. As used herein, the vinylidene fluoride-copolymerized fluorine-containing elastomer copolymer having a glass transition temperature and a melting point is produced by either one of methods of (A) a method comprising charging 20 to 40 wt % of entire charged monomers before starting a polymerization reaction; performing a copolymerization reaction with charged monomer compositions of vinylidene fluoride and hexafluoropropylene being 75 to 85 wt % and 25 to 15 wt %, respectively, before the start of the polymerization reaction; and continuing the copolymerization reaction by keeping the monomer charged compositions of vinylidene fluoride and hexafluoropropylene to be added during the polymerization reaction to 65 to 80 mol % and 35 to 20 mol %, respectively, the vinylidene fluoride and the hexafluoropropylene being in an amount of 60 to 80 wt % of the entire charged monomers, or (B) a method comprising performing a copolymerization reaction by charging an entire amount of hexafluoropropylene and 25 wt % or less of an entire charged amount of vinylidene fluoride before starting a polymerization reaction; and continuing the copolymerization reaction by adding 75 wt % or more of the entire charged amount of vinylidene fluoride, preferably, continuing the copolymerization reaction by charging a monomer mixture having monomer charged compositions of vinylidene fluoride and hexafluoropropylene of 15 to 35 mol % and 85 to 65 mol %, respectively, before starting the polymerization reaction.

Effect of the Invention

The fluororubber composition according to the present invention attains excellent effects of suppressing a change in hardness (an increase in hardness) of a crosslinked rubber product which is otherwise caused by crystallization of a vinylidene fluoride sequence by using PTFE as a filler and kneading the filler with a specific fluorine-containing elastomer copolymer to give a polymer alloy (mechanical blending) and of achieving high hardness of a crosslinked molded article without impairing kneadability and the like of the fluororubber composition by using the fluorine-containing copolymer having the specific composition. Further, it is possible to suppress foaming during crosslinking and molding, which is observed when polyol crosslinking is performed by using PTFE alone as the filler, by using magnesium oxide and hydrotalcite as crosslinking aids for the polyol crosslinking.

EMBODIMENTS FOR CARRYING OUT THE INVENTION

The vinylidene fluoride-copolymerized, fluorine-containing elastomer copolymer is not particularly limited insofar as a copolymer unit thereof is at least a vinylidene fluoride (VdF), and examples thereof include a VdF/HFP copolymer, a VdF/HFP/TFE terpolymer, and the like. As used herein, HFP means hexafluoropropylene, and TFE means tetrafluoroethylene. As the fluorine-containing elastomer copolymer, those which facilitate crystallization by forming a long VdF homosequence, have a glass transition temperature and a melting point due to dispersed formation of a crystalline portion in a molecular chain of the polymer, and preferably have a crystal fusion enthalpy $\Delta H$ of 1.0 J/g or more are used.

Examples of a method for producing the above-described fluorine-containing elastomer copolymer include the following methods (A) and (B).

(A) A method comprising charging 20 to 40 wt % of entire charged monomers before starting a polymerization reaction; performing a copolymerization reaction with charged monomer compositions of vinylidene fluoride and hexafluoropropylene being 75 to 85 wt % and 25 to 15 wt %, respectively, before the start of the polymerization reaction; and continuing the copolymerization reaction by keeping the monomer charged compositions of vinylidene fluoride and hexafluoropropylene to be added during the polymerization reaction to 65 to 80 mol % and 35 to 20 mol %, respectively, the vinylidene fluoride and the hexafluoropropylene being in an amount of 60 to 80 wt % of the entire charged monomers, or (B) A method comprising performing a copolymerization reaction by charging an entire amount of HFP and 25 wt % or less of an entire charged amount of VdF, preferably by charging 15 to 35 mol % of HFP and 85 to 65 mol % of VdF, before starting a polymerization reaction; and continuing the copolymerization reaction by adding 75 wt % or more of the entire charged amount of vinylidene fluoride.

In order to form the long VdF homosequence, the reaction is started under the conditions where VdF is allowed to preferentially react at an initial stage of the polymerization reaction, e.g., at the VdF excess concentration, and HFP is excessively added in a middle stage or an end stage so as to obtain a target composition in the production method (A), while, in the production method (B), the initial VdF charged amount is extremely suppressed in order to start the reaction under the conditions where HFP is allowed to preferentially react, i.e. in order to start the reaction at the HFP rich concentration, at an initial stage of the reaction, such as the conditions including charging the entire amount of HFP before the start of the reaction, and the rich amount of VdF is added at a middle stage or an end stage of the reaction in order to attain a target polymer composition.

As a specific method for adjusting reaction field concentrations of VdF and HFP at the initial stage of the reaction, each of the charged amounts of VdF and HFP is increased or reduced, or a pressure is increased or reduced by increasing or reducing a space in a reactor with water. Alternatively, it is possible to adjust the reaction field concentrations by changing a reaction temperature through utilizing the fact that solubility of the monomers to water changes depending on a temperature.

The copolymerization reaction is performed by allowing the copolymerization reaction in an aqueous medium in the presence of a surfactant. The copolymerization reaction in aqueous medium may be performed as suspension polymerization, but emulsion polymerization is preferred from the viewpoints of productivity and economy.

The emulsion polymerization reaction is performed by using as a catalyst a water-soluble inorganic peroxide such as ammonium persulfate, potassium persulfate, and sodium persulfate or a redox system of the water-soluble inorganic peroxide and a reducing agent such as sodium sulfite and sodium bisulfite, in the presence of the surfactant as a generally-used emulsifier at a ratio of about 0.001 to 0.2 wt % relative to an entire charged water amount, and under the conditions of a pressure generally of about 0 to 10 MPa, preferably about 0.5 to 4 MPa and a temperature of about 0° C. to 100° C., preferably about 20° C. to 80° C. In the reaction, in order to maintain the reaction pressure within a constant range, fluorinated olefin (mixture) to be fed may preferably be fed in batches. Also, in order to adjust pH in the polymerization system, an electrolytic substance having buffer capacity such as $Na_2HPO_4$, $NaH_2PO_4$, and $KH_2PO_4$ or a sodium hydroxide may be added. Further, when so required, a chain transfer agent such as ethyl malonate, acetone, and isopropanol may appropriately be used.

As the emulsifier, known fluorinated carboxylate, sulfonate, or phosphonate may be used. Examples of fluorinated carboxylic acid to be used as a metal salt or an ammonium salt include fluorinated alkyl carboxylic acid represented by a general formula Rf-COOH, containing an Rf group (polyfluoroalkyl group, preferably perfluoroalkyl group), having 4 to 10 carbon atoms and fluoro(poly)ether carboxylic acid represented by a general formula Rf'-COOH (wherein Rf' is a fluoroalkyloxyalkyl group having 3 to 12 carbon atoms and containing one or more oxygen atoms), and preferably, $CF_3CF_2CF_2OCF(CF_3)CF_2OCF(CF_3)$ $COONH_4$(2,3,3,3-tetrafluoro-2-[1,1,2,3,3,3-hexafluoro-2-(1,1,2,2,3,3,3-heptafluoropropoxy)propoxy]-1-ammonium propanoate) is used.

The polymerization reaction is generally terminated in about 1 to 15 hours though it can be influenced by the polymerization reaction conditions, and, after the reaction, a product copolymer is coagulated by adding a potassium alum solution, a sodium chloride solution, a calcium chloride solution, or the like to the obtained aqueous emulsion, followed by washing with water and drying, thereby obtaining the fluorine-containing copolymer.

For the obtained fluorine-containing copolymer, a PTFE filler, preferably PTFE in the form of a powder having an average particle diameter of 20 μn or less measured by a dry laser method is used at a ratio of 5 to 100 parts by weight, preferably 5 to 70 parts by weight, per 100 parts by weight of the fluorine-containing copolymer. When the PTFE filler is used at a ratio smaller than the above-specified ratio, it is difficult to attain the desired hardness. When the PTFE is used at a ratio larger than the above-specified ratio, kneading workability of the fluororubber composition is deteriorated. As the PTFE filler, the one having an average particle diameter of 0.1 to 20 μm is used, and a commercially available PTFE filler such as L-5F manufactured by Daikin Industries, Ltd. and L172J manufactured by Asahi Glass Co., Ltd. may be used as it is.

To the fluorine-containing copolymer blended with the PTFE filler, a polyol crosslinking agent and magnesium oxide and hydrotalcite serving as crosslinking aids for the polyol crosslinking agent are added to perform crosslinking. Examples of the polyol crosslinking agents include bisphenol A, bisphenol F, bisphenol AF, 1,3,5-trihydroxybenzene, 1,5-dihydroxynaphthalene, 2,7-dihydroxynaphthalene, 2,2-bis(4-hydroxyphenyl)butane, 3,3',5,5'-tetrachlorobisphenol A, 4,4-dihydroxydiphenyl, and the like, and preferred examples include bisphenol A, bisphenol F, bisphenol AF, etc. These polyol crosslinking agents may be used also in the form of their metal salts, preferably alkali metal salts.

Further, when so required, a quaternary ammonium salt (including a nitrogen-containing heterocyclic compound) or a quaternary phosphonium salt which is a quaternary onium salt, such as a compound represented by a general formula:

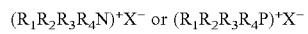

wherein $R_1$ to $R_4$: alkyl group, alkoxyl group, aryl group, alkylaryl group, aralkyl group, or polyoxyalkylene group having 1 to 25 carbon atoms, or 2 to 3 thereof may form a heterocyclic structure with N or P; and $X^-$: anion such as $Cl^-$, $Br^-$, $I^-$, $HSO_4^-$, $H_2PO_4^-$, $RCOO^-$, $ROSO_2^-$, $CO_3^-$, $BF_4^-$, and the like
may be used as a crosslinking accelerator.

As the quaternary onium salt crosslinking accelerator, a quaternary ammonium salt such as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyldibenzylammonium bromide, cetyldimethylethylammonium bromide, octadecyltrimethylammonium bromide, cetylpyridinium chloride, cetylpyridinium bromide, cetylpyridinium iodide, cetylpyridinium sulfate, 1-benzylpyridinium chloride, 1-benzyl-3,5-dimethylpyridinium chloride, 1-benzyl-4-phenylpyridinium chloride, 1,4-dibenzylpyridinium chloride, 1-benzyl-4-(pyrrolidinyl)pyridinium chloride, 1-benzyl-4-pyridinopyridinium chloride, tetraethylammonium acetate, trimethylbenzylammonium benzoate, trimethylbenzylammonium-p-toluene sulfonate, and trimethylbenzylammonium borate; a quaternary phosphonium salt such as tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphoniumdimethyl phosphate, tetraoctylphosphonium chloride, and cetyldimethylbenzylphosphonium chloride; or the like may be used. Also, as the nitrogen-containing heterocyclic compound, 8-benzyl-1,8-diazabicyclo[5,4,0]-undec-7-enium chloride, 1,8-diazabicyclo[5,4,0]-undecene-7-methylammonium methosulfate, 5-benzyl-1,5-diazabicyclo[4,3,0]-5-nonenium chloride, 5-benzyl-1,5-diazabicyclo[4,3,0]-5-nonenium bromide, 5-benzyl-1,5-diazabicyclo[4,3,0]-5-nonenium tetrafluoroborate, 5-benzyl-1,5-diazabicyclo[4,3,0]-5-nonenium hexafluorophosphate, or the like may be used, for example.

Among the above-described components, the polyol crosslinking agent may be used at a ratio of 0.5 to 10 parts by weight, preferably 2 to 6 parts by weight; magnesium oxide may be used at a ratio of 1 to 15 parts by weight, preferably 2 to 5 parts by weight, and hydrotalcite may be used at a ratio of 0.1 to 2 parts by weight, preferably 0.5 to 2 parts by weight, per 100 parts by weight of the fluorine-containing elastomer copolymer. In the case of using the crosslinking accelerator, it is used at a ratio of 0.1 to 10 parts by weight, preferably 0.5 to 2 parts by weight. When at least one of magnesium oxide and hydrotalcite is used at a ratio smaller than the above-specified ratio, a vulcanization rate is so slow that it is not practical from industrial point of view, and a crosslinked molded article is subject to foaming. On the other hand, when at least one of magnesium oxide and hydrotalcite is used at a ratio larger than the above-specified ratio, crosslinking is accelerated to deteriorate fluidity, thereby deteriorating moldability. In the case of using PTFE alone as the filler, gas permeability is poor as compared to the case of adding an inorganic filler such as carbon black and silica, and foaming occurs during crosslinking and molding with the crosslinking aid (calcium oxide/magnesium oxide) for the polyol crosslinking used in Patent Document 1 or with the crosslinking aid (calcium oxide/hydrotalcite) for polyol crosslinking used in Patent Document 2. However, the foaming during crosslinking and molding is suppressed in the case where magnesium oxide and hydrotalcite are used as the crosslinking agents.

EXAMPLES

Hereinafter, examples of the present invention will be described.

Production Example 1

Polymerization Method (A)

A 10 L-stainless steel pressure reactor with a stirrer was charged with

| | |
|---|---|
| Water | 5550 g |
| $CF_3CF_2CF_2OCF(CF_3)CF_2OCF(CF_3)COONH_4$ (emulsifier) | 10 g |
| Disodium hydrogen phosphate•dodecahydrate (buffering agent) | 3 g |
| Acetone (chain transfer agent) | 15 g | and an internal space was substituted with a nitrogen gas. After that,

| | |
|---|---|
| Vinylidene fluoride [VdF] | 700 g (77.0 mol %) |
| Hexafluoropropylene [HFP] | 490 g (23.0 mol %) | were charged as an initially charged gas, and a temperature inside the reactor was raised to 80° C. A pressure inside the reactor at this stage was 3.66 MPa·G.

After confirming that the temperature inside the reactor was stable, a polymerization initiator solution obtained by dissolving 3.5 g of ammonium persulfate (reaction initiator) into 100 g of ion exchange water was pressure-injected into the reactor to start the polymerization reaction. After starting the polymerization reaction, a mixture gas of VdF/HFP=68.5/31.5 (mol %) was further added in batches when the inner pressure reached 3.40 MPa·G, and the pressure inside the reactor was raised to 3.50 MPa·G. During the polymerization reaction, the mixture gas of VdF/HFP=68.5/31.5 (mol %) was added in batches to maintain the reaction pressure to 3.40 to 3.50 MPa·G. The addition in batches was stopped when a total amount of the VdF/HFP mixture gas reached 2,120 g (1,020 g/1,100 g), and the reactor was cooled when the pressure inside the reactor reached 1.45 MPa·G to terminate the polymerization reaction. Time required from the charging of the reaction initiator to the termination of the polymerization reaction was 278 minutes.

A VdF/HFP copolymer obtained by coagulating 8,425 g of an aqueous dispersion of the obtained fluorine-containing elastomer copolymer with the same amount of a 2 wt %-$CaCl_2$ aqueous solution and subjecting to filtration was washed with a 10-fold amount of ion exchange water for 5 times, followed by drying using a vacuum drier, thereby obtaining 2,690 g of a VdF/HFP elastomer copolymer A. A polymer yield (relative to added monomers) was 81.3%, and the copolymer composition was VdF/HFP=78.0/22.0 (mol %) when measured by $^{19}$F-NMR.

20 mg of the obtained copolymer A was heated to 200° C. as a first step by using a differential scanning calorimetry device (DSC6220 Highly Sensitive DSC manufactured by SII Nano Technology Inc.), under a nitrogen atmosphere, and at a heating rate of 10° C./min and then cooled to −50° C. as a second step at a cooling rate of 10° C./min. Finally, as a third step, the copolymer A was heated to 200° C. again at a heating rate of 10° C./min, and measurements of a crystallization peak and a transition enthalpy in the second step and confirmation of a crystal melting point, a crystal fusion enthalpy ΔH, and a glass transition temperature Tg in the third step were conducted. As a result, the crystallization peak was confirmed at 30° C., the transition enthalpy was 1.7 J/g, the crystal melting point was confirmed at 95° C., the crystal fusion enthalpy ΔH was 1.7 J/g, and the glass transition temperature was −22° C.

Production Example 2

Polymerization Method (B)

A 10 L-stainless steel pressure reactor with a stirrer was charged with

| | |
|---|---|
| Water | 5600 g |
| $CF_3CF_2CF_2OCF(CF_3)CF_2OCF(CF_3)COONH_4$ (emulsifier) | 10 g |
| Disodium hydrogen phosphate•dodecahydrate (buffering agent) | 3 g |
| Acetone (chain transfer agent) | 15 g | and an internal space was substituted with a nitrogen gas. After that,

| | |
|---|---|
| Vinylidene fluoride [VdF] | 270 g (33.6 mol %) |
| Hexafluoropropylene [HFP] | 1250 g (66.4 mol %) | were charged as an initially charged gas, and a temperature inside the reactor was raised to 80° C. A pressure inside the reactor at this stage was 3.07 MPa·G.

After confirming that the temperature inside the reactor was stable, a polymerization initiator solution obtained by dissolving 5 g of ammonium persulfate (reaction initiator) into 100 g of ion exchange water was pressure-injected into the reactor to start the polymerization reaction. After starting the polymerization reaction, a VdF gas (100 mol %) was further added in batches when the inner pressure reached 2.90 MPa·G, and the pressure inside the reactor was raised to 3.00 MPa·G. During the polymerization reaction, the VdF gas (100 mol %) was added in batches to maintain the reaction pressure to 2.90 to 3.00 MPa·G. The addition in batches was stopped when a total amount of the VdF gas (100 mol %) reached 1460 g, and the reactor was cooled when the pressure inside the reactor reached 1.35 MPa·G to terminate the polymerization reaction. Time required from the charging of the reaction initiator to the termination of the polymerization reaction was 277 minutes.

8,112 g of an aqueous dispersion of the obtained fluorine-containing elastomer copolymer was subjected to washing and drying in the same manner as in Example 1 to obtain 2,480 g of a VdF/HFP elastomer copolymer B. A polymer yield was 83.2%, and the copolymer composition was VdF/HFP=78.1/21.9 (mol %). As a result of DSC measurement conducted in the same manner as in Example 1, a crystallization peak was confirmed at 21° C., a transition enthalpy was 3.1 J/g, a moderate transition which was considered to be a crystal melting point was confirmed at 83° C., a crystal fusion enthalpy ΔH was 4.6 J/g, and a glass transition temperature was −21° C.

Production Example 3

Polymerization Method (A)

A 10 L-stainless steel pressure reactor with a stirrer was charged with

| | |
|---|---|
| Water | 5550 g |
| $CF_3CF_2CF_2OCF(CF_3)CF_2OCF(CF_3)COONH_4$ (emulsifier) | 10 g |
| Disodium hydrogen phosphate•dodecahydrate (buffering agent) | 3 g |
| Acetone (chain transfer agent) | 18 g | and an internal space was substituted with a nitrogen gas. After that,

| | |
|---|---|
| Vinylidene fluoride [VdF] | 660 g (81.5 mol %) |
| Hexafluoropropylene [HFP] | 350 g (18.5 mol %) | were charged as an initially charged gas, and a temperature inside the reactor was raised to 80° C. A pressure inside the reactor at this stage was 3.69 MPa·G.

After confirming that the temperature inside the reactor was stable, a polymerization initiator solution obtained by dissolving 3.5 g of ammonium persulfate (reaction initiator) into 100 g of ion exchange water was pressure-injected into the reactor to start the polymerization reaction. After starting the polymerization reaction, a mixture gas of VdF/HFP=78.2/21.8 (mol %) was further added in batches when the inner pressure reached 3.40 MPa·G, and the pressure inside the reactor was raised to 3.50 MPa·G. During the polymerization reaction, the VdF/HFP=78.2/21.8 (mol %) mixture gas was added in batches to maintain the reaction pressure to 3.40 to 3.50 MPa·G. The addition in batches was stopped when a total amount of the VdF/HFP mixture gas reached 2,250 g (1,360 g/890 g), and the reactor was cooled when the pressure inside the reactor reached 1.71 MPa·G to terminate the polymerization reaction. Time required from the charging of the reaction initiator to the termination of the polymerization reaction was 316 minutes.

7,815 g of an aqueous dispersion of the obtained fluorine-containing elastomer copolymer was subjected to washing and drying in the same manner as in Example 1 to obtain 2,550 g of a VdF/HFP elastomer copolymer C. A polymer yield was 78.2%, and the copolymer composition was VdF/HFP=84.2/15.8 (mol %). As a result of DSC measurement conducted in the same manner as in Example 1, a crystallization peak was confirmed at 72° C., a transition enthalpy was 5.6 J/g, a crystal melting point was confirmed at 124° C., a crystal fusion enthalpy ΔH was 3.7 J/g, and a glass transition temperature was −26° C.

Comparative Production Example

According to Polymerization Method (A)

A 10 L-stainless steel pressure reactor with a stirrer was charged with

| | |
|---|---|
| Water | 5100 g |
| $CF_3CF_2CF_2OCF(CF_3)CF_2OCF(CF_3)COONH_4$ (emulsifier) | 10 g |
| Disodium hydrogen phosphate•dodecahydrate (buffering agent) | 3 g |
| Acetone (chain transfer agent) | 18 g | and an internal space was substituted with a nitrogen gas. After that,

| Vinylidene fluoride [VdF] | 260 g (47.2 mol %) |
|---|---|
| Hexafluoropropylene [HFP] | 680 g (52.8 mol %) | were charged as an initially charged gas, and a temperature inside the reactor was raised to 80° C. A pressure inside the reactor at this stage was 3.11 MPa·G.

After confirming that the temperature inside the reactor was stable, a polymerization initiator solution obtained by dissolving 3.5 g of ammonium persulfate (reaction initiator) into 100 g of ion exchange water was pressure-injected into the reactor to start the polymerization reaction. After starting the polymerization reaction, a mixture gas of VdF/HFP=79.9/20.1 (mol %) was further added in batches when the inner pressure reached 3.00 MPa·G, and the pressure inside the reactor was raised to 3.10 MPa·G. During the polymerization reaction, the VdF/HFP=79.9/20.1 (mol %) mixture gas was added in batches to maintain the reaction pressure to 3.00 to 3.10 MPa·G. The addition in batches was stopped when a total amount of the VdF/HFP mixture gas reached 2,100 g (1,320 g/780 g), and the reactor was cooled when the pressure inside the reactor reached 1.10 MPa·G to terminate the polymerization reaction. Time required from the charging of the reaction initiator to the termination of the polymerization reaction was 251 minutes.

7,760 g of an aqueous dispersion of the obtained fluorine-containing elastomer copolymer was subjected to washing and drying in the same manner as in Example 1 to obtain 2,460 g of a VdF/HFP elastomer copolymer D. A polymer yield was 80.9%, and the copolymer composition was VdF/HFP=78.0/22.0 (mol %). As a result of DSC measurement conducted in the same manner as in Example 1, a crystallization peak and a crystal melting point were not observed. A glass transition temperature was −22° C.

Example 1

The following components:

| | |
|---|---|
| VdF/HFP elastomer copolymer A obtained by Production Example 1 | 100 parts by weight |
| PTFE filler (L-5F manufactured by Daikin Industries, Ltd.) | 35 parts by weight |
| Magnesium oxide (Kyowamag #150 manufactured by Kyowa Chemical Industry Co., Ltd.) | 3 parts by weight |
| Hydrotalcite (DHT-4A manufactured by Kyowa Chemical Industry Co., Ltd.) | 1 part by weight |
| Bisphenol AF (Curative #30; active ingredient: 50 wt %) | 3.5 parts by weight |
| 5-benzyl-1,5-diazabicyclo [4,3,0]-5-noneniumtetrafluoroborate | 0.875 part by weight | were kneaded by using a pressure kneader and an open roller, followed by first crosslinking (pressing) at 180° C. for 6 minutes and then by secondary crosslinking (oven crosslinking) at 260° C. for 10 hours. The thus-obtained crosslinked and molded crosslinked sheet (100×200×2 mm) and molded stopper were subjected to a hardness test, a separation test, a viscosity test, and measurement of impact resiliency coefficients.

Hardness test: According to JIS K6235 (1997). Instantaneous hardness of the crosslinked sheet was measured by using a type-A durometer at an initial stage and after storing at 25° C. for 14 days Separation test: The molded stopper was placed in a glass beaker filled with filtered pure water, and then an ultrasonic wave was applied thereto for a minute. After that, particles of 0.5 μm or more extracted into the pure water were measured by using a liquid particle counter (KS-28, a residual dust measurement device produced by Rion Co., Ltd.)

The less the particle amount, the material is the cleaner

Viscosity test: The molded stopper of a magnet-hold type was mounted to an HDD actual device, and the stopper and an arm were brought into contact with each other (1) at an initial stage and (2) by way of a magnetic force, while applying thereto environmental loads of 80° C. and a relative humidity of 80% RH for 10 hours. After that, the arm was rotated to measure a tearing force when the arm was detached from the stopper before and after the environmental loads were applied, and a holding torque increase ratio was calculated Holding torque increase ratio (%) =

[(tearing force after environmental loads − initial tearing force)/initial tearing force] × 100.

Measurement of impact resiliency coefficient: According to JIS K6255.
  A test piece was obtained by laminating six rubber sheets each having a thickness of 2 mm and a diameter of 29 mm, and an impact resiliency coefficient was measured at −20° C., 25° C., and 80° C. by the Luepke method
  As a stopper for use in HDD, the lower the impact resiliency coefficient, the absorption of vibration of the arm is the better Example 2

In Example 1, the amount of the PTFE filler was changed to 5 parts by weight.

Example 3

In Example 1, the amount of the PTFE filler was changed to 70 parts by weight.

Example 4

In Example 1, the amount of hydrotalcite was changed to 0.5 parts by weight.

Example 5

In Example 1, the amount of hydrotalcite was changed to 2 parts by weight.

Example 6

In Example 1, 7.5 parts by weight of triphenylbenzylphosphonium chloride (Curative #20; active ingredient: 33 wt %) was used in place of 5-benzyl-1,5-diazabicyclo[4,3,0]-5-nonenium tetrafluoroborate.

Example 7

In Example 1, the same amount of the VdF/HFP elastomer copolymer B obtained by Production Example 2 was used in place of the VdF/HFP elastomer copolymer A of Production Example 1.

Example 8

In Example 1, the same amount of the VdF/HFP elastomer copolymer C obtained by Production Example 3 was used in place of the VdF/HFP elastomer copolymer A of Production Example 1.

Comparative Example 1

In Example 1, 5 parts by weight of FEF carbon black (Seast G-S0 manufactured by Tokai Carbon Co., Ltd.) was further used.

Comparative Example 2

In Example 1, 35 parts by weight of MT carbon black (N990, product of Huber) was used in place of the PTFE filler.

Comparative Example 3

In Example 1, the amount of hydrotalcite was changed to 3 parts by weight.

Comparative Example 4

In Example 1, 3 parts by weight of calcium oxide (Cal Dick #2000 manufactured by Ohmi Chemical Industry Co., Ltd.) was used in place of hydrotalcite.

Comparative Example 5

In Example 1, the amount of the PTFE filler was changed to 105 parts by weight.

Reference Example

In Example 1, the same amount of the fluorine-containing elastomer copolymer D obtained by Comparative Production Example was used as the fluororubber.

The results obtained in Examples and Comparative Examples are shown in the following table. It was impossible to perform the evaluation of Comparative Examples 3 and 4 due to foaming of the crosslinked molded articles and Comparative Example 5 due to poor kneading workability and defective dispersion.

In the case of Reference Example, it is difficult to adjust the hardness unlike Examples.

The invention claimed is:

1. A fluororubber composition comprises, relative to 100 parts by weight of a vinylidene fluoride-copolymerized, fluorine-containing elastomer copolymer having a glass transition temperature and a melting point, 5 to 100 parts by weight of a PTFE filler, 0.5 to 10 parts by weight of a polyol crosslinking agent, 1 to 15 parts by weight of magnesium oxide, and 0.1 to 2 parts by weight of hydrotalcite, wherein said fluororubber composition does not contain any other inorganic reinforcing filler.

2. The fluororubber composition according to claim 1, further comprising 0.1 to 10 parts by weight of a quaternary onium salt crosslinking accelerator.

3. The fluororubber composition according to claim 1, wherein the fluorine-containing elastomer copolymer has a crystal fusion enthalpy ΔH of 1.0 J/g or more.

4. The fluororubber composition according to claim 1, wherein the vinylidene fluoride-copolymerized, fluorine-containing elastomer copolymer is produced by charging 20 to 40 wt % of entire charged monomers before starting a polymerization reaction; performing a copolymerization reaction with charged monomer compositions of vinylidene fluoride and hexafluoropropylene being 75 to 85 wt % and 25 to 15 wt %, respectively, before the start of the polymerization reaction; and continuing the copolymerization reaction by keeping the monomer charged compositions of vinylidene fluoride and hexafluoropropylene to be added during the polymerization reaction to 65 to 80 mol % and 35 to 20 mol %, respectively, the vinylidene fluoride and the hexafluoropropylene being in an amount of 60 to 80 wt % of the entire charged monomers.

5. The fluororubber composition according to claim 1, the vinylidene fluoride-copolymerized, fluorine-containing elastomer copolymer is produced by performing copolymerization reaction by charging an entire amount of hexafluoropropylene and 25 wt % or less of an entire charged amount of vinylidene fluoride before starting a polymerization reaction; and continuing the copolymerization reaction by adding 75 wt % or more of the entire charged amount of vinylidene fluoride.

6. The fluororubber composition according to claim 5, wherein a fluorine-containing elastomer copolymer produced by charging a monomer mixture having monomer

TABLE

| | Example | | | | | | | | Comp. Ex. | | |
|---|---|---|---|---|---|---|---|---|---|---|---|
| Items | 1 | 2 | 3 | 4 | 5 | 6 | 7 | 8 | 1 | 2 | Ref. Ex. |
| Hardness Test | | | | | | | | | | | |
| Initial hardness (Duro A) | 81 | 72 | 90 | 81 | 82 | 84 | 88 | 86 | 82 | 78 | 72 |
| Hardness change (Point) | 0 | +1 | 0 | 0 | 0 | 0 | +1 | +2 | 0 | +3 | 0 |
| Separation Test | | | | | | | | | | | |
| Number of particles | 1 | 1 | 1 | 1 | 1 | 1 | 1 | 1 | 10 | 10 | 1 |
| Viscosity Test | | | | | | | | | | | |
| Holding torque increase ratio(%) | 13 | 15 | 11 | 17 | 12 | 15 | 13 | 13 | 12 | 15 | 12 |
| Impact resiliency coefficient | | | | | | | | | | | |
| −20° C. (%) | 31 | 28 | 32 | 30 | 32 | 30 | 29 | 29 | 30 | 25 | 28 |
| +25° C. (%) | 12 | 13 | 11 | 11 | 13 | 13 | 11 | 11 | 13 | 13 | 11 |
| +80° C. (%) | 41 | 46 | 40 | 40 | 42 | 40 | 43 | 45 | 43 | 46 | 40 | charged compositions of vinylidene fluoride and hexafluoropropylene of 15 to 35 mol % and 85 to 65 mol %, respectively, before starting the polymerization reaction, is used.

7. A fluororubber composition comprises, relative to 100 parts by weight of a vinylidene fluoride-copolymerized, fluorine-containing elastomer copolymer having a glass transition temperature and a melting point, 35 to 100 parts by weight of a PTFE filler, 0.5 to 10 parts by weight of a polyol crosslinking agent, 1 to 15 parts by weight of magnesium oxide, and 0.1 to 2 parts by weight of hydrotalcite, wherein said fluororubber composition does not contain any other inorganic reinforcing filler.

8. The fluororubber composition according to claim 7, further comprising 0.1 to 10 parts by weight of a quaternary onium salt crosslinking accelerator.

9. The fluororubber composition according to claim 7, wherein the fluorine-containing elastomer copolymer has a crystal fusion enthalpy $\Delta H$ of 1.0 J/g or more.

10. The fluororubber composition according to claim 7, wherein the vinylidene fluoride-copolymerized, fluorine-containing elastomer copolymer is produced by charging 20 to 40 wt % of entire charged monomers before starting a polymerization reaction; performing a copolymerization reaction with charged monomer compositions of vinylidene fluoride and hexafluoropropylene being 75 to 85 wt % and 25 to 15 wt %, respectively, before the start of the polymerization reaction; and continuing the copolymerization reaction by keeping the monomer charged compositions of vinylidene fluoride and hexafluoropropylene to be added during the polymerization reaction to 65 to 80 mol % and 35 to 20 mol %, respectively, the vinylidene fluoride and the hexafluoropropylene being in an amount of 60 to 80 wt % of the entire charged monomers.

11. The fluororubber composition according to claim 7, the vinylidene fluoride-copolymerized, fluorine-containing elastomer copolymer is produced by performing copolymerization reaction by charging an entire amount of hexafluoropropylene and 25 wt % or less of an entire charged amount of vinylidene fluoride before starting a polymerization reaction; and continuing the copolymerization reaction by adding 75 wt % or more of the entire charged amount of vinylidene fluoride.

12. The fluororubber composition according to claim 11, wherein a fluorine-containing elastomer copolymer produced by charging a monomer mixture having monomer charged compositions of vinylidene fluoride and hexafluoropropylene of 15 to 35 mol % and 85 to 65 mol %, respectively, before starting the polymerization reaction, is used.

13. The fluororubber composition according to claim 12, further consisting of 0.1 to 10 parts by weight of a quaternary onium salt crosslinking accelerator.

14. The fluororubber composition according to claim 12, wherein the fluorine-containing elastomer copolymer has a crystal fusion enthalpy $\Delta H$ of 1.0 J/g or more.

15. The fluororubber composition according to claim 12, wherein the vinylidene fluoride-copolymerized, fluorine-containing elastomer copolymer is produced by charging 20 to 40 wt % of entire charged monomers before starting a polymerization reaction; performing a copolymerization reaction with charged monomer compositions of vinylidene fluoride and hexafluoropropylene being 75 to 85 wt % and 25 to 15 wt %, respectively, before the start of the polymerization reaction; and continuing the copolymerization reaction by keeping the monomer charged compositions of vinylidene fluoride and hexafluoropropylene to be added during the polymerization reaction to 65 to 80 mol % and 35 to 20 mol %, respectively, the vinylidene fluoride and the hexafluoropropylene being in an amount of 60 to 80 wt % of the entire charged monomers.

16. The fluororubber composition according to claim 12, the vinylidene fluoride-copolymerized, fluorine-containing elastomer copolymer is produced by performing copolymerization reaction by charging an entire amount of hexafluoropropylene and 25 wt % or less of an entire charged amount of vinylidene fluoride before starting a polymerization reaction; and continuing the copolymerization reaction by adding 75 wt % or more of the entire charged amount of vinylidene fluoride.

17. The fluororubber composition according to claim 15, wherein a fluorine-containing elastomer copolymer produced by charging a monomer mixture having monomer charged compositions of vinylidene fluoride and hexafluoropropylene of 15 to 35 mol % and 85 to 65 mol %, respectively, before starting the polymerization reaction, is used.

18. A fluororubber composition that consists essentially of 100 parts by weight of a vinylidene fluoride-copolymerized, fluorine-containing elastomer copolymer having a glass transition temperature and a melting point, 5 to 100 parts by weight of a PTFE filler, 0.5 to 10 parts by weight of a polyol crosslinking agent, 1 to 15 parts by weight of magnesium oxide, and 0.1 to 2 parts by weight of hydrotalcite, wherein said fluororubber composition does not contain any other inorganic reinforcing filler.

* * * * *